(12) United States Patent
Erickson et al.

(10) Patent No.: US 9,767,389 B2
(45) Date of Patent: Sep. 19, 2017

(54) METHOD AND APPARATUS FOR UTILIZING REPRESENTATIONAL IMAGES IN ANALYTICAL ACTIVITIES

(71) Applicants: Ronald R. Erickson, Brooklyn, NY (US); Joel N. Bock, Teaneck, NJ (US); Eliezer D. Sandler, Brooklyn, NY (US)

(72) Inventors: Ronald R. Erickson, Brooklyn, NY (US); Joel N. Bock, Teaneck, NJ (US); Eliezer D. Sandler, Brooklyn, NY (US)

(*) Notice: Subject to any disclaimer, the term of this patent is extended or adjusted under 35 U.S.C. 154(b) by 266 days.

(21) Appl. No.: 14/082,927

(22) Filed: Nov. 18, 2013

(65) Prior Publication Data

US 2014/0119667 A1    May 1, 2014

Related U.S. Application Data

(62) Division of application No. 10/282,615, filed on Oct. 29, 2002, now Pat. No. 8,587,590.

(60) Provisional application No. 60/343,374, filed on Dec. 21, 2001, provisional application No. 60/343,381, filed on Dec. 21, 2001, provisional application No. 60/335,038, filed on Oct. 30, 2001.

(51) Int. Cl.
*G06K 9/76* (2006.01)
*G06T 11/20* (2006.01)

(52) U.S. Cl.
CPC .............. *G06K 9/76* (2013.01); *G06T 11/206* (2013.01)

(58) Field of Classification Search
CPC ......... G06K 9/76; G06F 3/0481; H04L 41/22; H04L 43/045; H04L 43/065; H04L 43/0817; H04L 43/16
USPC ........................................................ 382/210
See application file for complete search history.

(56) References Cited

U.S. PATENT DOCUMENTS 5,748,347 A * 5/1998 Erickson ................ G03H 1/268
                                                                  359/15
5,910,111 A * 6/1999 Hunziker ............... A61B 6/503
                                                                  359/23

* cited by examiner

*Primary Examiner* — Manuchehr Rahmjoo

(57) ABSTRACT

In a method and apparatus for performing an analysis and other activities using one or more two- or three-dimensional representational images, presenting a two- or three-dimensional representational image containing analytical information to assist in the analytical process. One or more two- or three-dimensional representational images are created, e.g., using standard photography, holography or computer imaging, and are placed in a positioner for use by the analyst. The representational images are illuminated using a light source and the analyst utilizes the information released from the representational image to perform an analysis.

20 Claims, 8 Drawing Sheets

METHOD AND APPARATUS FOR UTILIZING REPRESENTATIONAL IMAGES IN ANALYTICAL ACTIVITIES

CROSS REFERENCE TO RELATED APPLICATIONS

This application is a Divisional of and claims priority to U.S. patent application Ser. No. 10/282,615 filed on Oct. 29, 2002, now U.S. Pat. No. 8,587,590 issued on Nov. 19, 2013, which claims priority to U.S. Provisional Application Ser. No. 60/335,038, filed Oct. 30, 2001, U.S. Provisional Patent Application Ser. No. 60/343,381, filed Dec. 21, 2001, and U.S. Provisional Patent Application Ser. No. 60/343,374, filed Dec. 21, 2001, each of which is hereby expressly incorporated herein by reference in its entirety.

FIELD OF THE INVENTION

The present invention relates to a method for creating and using representational images, including holographic representational images in various activities, including, but not limited to, data analysis, short and long range planning, statistical analysis, projections, forecasting, strategic analysis, decision making, scheduling and routing. According to the present invention representational images, including holographic representational images may be used to enhance accurate analysis, facilitate improved presentation and comprehension of information, and implementation and quality of tasks associated with such information, and reduce errors and misinterpretation.

BACKGROUND OF THE INVENTION

Representational images are very useful as a tool for providing and presenting large amounts of information in a concise and understandable manner for a wide range of analytical activities involved in industry, including, for example, data analysis, short and long range planning, statistical analysis, projections, forecasting, strategic analysis, decision making, scheduling, routing, strategic planning, change implementation and verification and quality assurance and control. Representational images may range, for example, from graphical charts, such as yen diagrams and pie charts to plotted information, such as, scatter diagrams.

There are many custom and off-the shelf software programs aimed at providing 2-dimensional or virtual 3-dimensional visualization of data in various formats in order to allow for an accurate and enhanced ability to analyze the data presented.

In the financial sector, with the continual growth in the amounts of information available for analysis and increasing complexity of the factors necessary for a proper analysis, and with the concern for accuracy and thoroughness, many institutions have designed or implemented systems to conglomerate the large amounts of data necessary for analysis into single or multiple charts and diagrams utilizing 2-dimensional or virtual 3-dimensional visualization techniques. This information may be used for financial analysis, risk analysis, forecasting, risk arbitrage, trend analysis, etc.

In the geological exploration sector, sonar and high frequency scanning radar as well as photography is used to locate and identify high potential geological formations of various desired elements. The information generated by these tools may be presented as 2-dimensional or virtual 3-dimensional images. Such information may also be used for mapping and remote location and identification.

Each of these systems and techniques are severely limited since the forms of visualization supported by such systems and techniques do not provide for the concise and effective presentation of sufficient amounts of the available data at any one time, thereby preventing a full and complete analysis of the data.

Despite the increase in the amounts of data able to be presented using enhanced 2-dimensional and virtual 3-dimensional visualization techniques, there remains much room for additional improvement and further optimization in the presentation and visualization of such data. The present invention provides for further optimization in the presentation and visualization of data through the use of representational images, including holographic representational images.

For example, information relating to a company's business may include a plurality of variables relating to customer purchases, such as, for example, demographics, including, age, location, sex, time of year, price, etc. Using a standard 2-dimensional or virtual 3-dimensional graph or chart, only three (or perhaps four) of these factors may be included in the visualization, thereby limiting the analysis able to be performed. To engage in a full analysis, multiple chart or graphs would have to be provided, each containing only three or four parts of the totality of the information available.

These are just some of the many areas where schematic diagrams or representational images are currently being used, and where improvements are possible and feasible through the use of representational images, including holographic representational images according to the present invention.

SUMMARY OF THE INVENTION

The present invention provides a method for creating and using representational images, including holographic representational images, and an apparatus for using representational images, to enhance accurate analysis, facilitate improved presentation and comprehension of information, and implementation and quality of tasks associated with such information, and reduce errors and misinterpretation.

The representational images described herein may be used as a Three Dimensional Visual Map (3DVM) type of representational image presented alone and/or together with a two-dimensional display, representational image and/or physical object. When presented alone, the 3DVM includes all of the information necessary for undertaking the desired analysis and facilitates the accurate analysis of the information. For example, when a 3DVM is used to analyze historic marketing information, such information is presented as a true three-dimensional image in the form of a holographic representational image (HRI). Using conventional holographic techniques, a true third-dimension can be added thereby at least almost doubling the amount of usable information available. Using the process described in U.S. Pat. No. 5,748,347 (V-3D™), incorporated herein by reference, an additional dimension may be added, for example, providing for the addition of the dimension of time into the analysis, and thereby significantly multiplying the amount of usable information available.

When presented together with a two-dimensional display, representational image and/or physical object, the 3DVM may include certain information, such as, for example, the historical or static information, while the two-dimensional display, representational image and/or physical object may include certain other information, such as, for example, the real time or dynamic information. Alternatively, the 3DVM may include the real time or dynamic information, while the two-dimensional display, representational image or physical object may include the historical or static information. For example, when analyzing geological information, the 3DVM may include information relating to the Doppler, radar or sonar images of the underground geological formations, for example, taken by satellite, and the two-dimensional representational image or physical object may include information relating to the corresponding above ground geological formations and/or depth information—simultaneously.

Another example, in the financial area, is where the 3DVM represents the static information, for example, relating to historical financial information about various companies, while the two-dimensional display represents the dynamic information, for example, current price and volume information and company news. Alternatively, the 3DVM may include information relating to a certain market segment with different points representing various companies in that market. When a particular point or company is selected, that point may be expanded to provide further two-dimensional or three-dimensional information relating to the company or the market. One or more points may be expanded by selecting the point using a keyboard, a pointing device, touch screen or voice control or through other selecting means to provide additional two- or three-dimensional information to the user. Alternatively, the point may be viewed with the naked eye or through some sort of magnification or other viewing device, with the additional or expanded information already included in the 3DVM. The expansion of information in the 3DVM may be accomplished using additional representational images designed into the 3DVM, for example, in particular locations. The expansion of information may also be accomplished by including magnification optics in the system used to create the 3DVMs. The points of magnification can be arranged, for example, to correspond to the particular pieces of information for which expansion is desired, or to the particular locations of such information.

The 3DVM may also be used to assist in the performance of financial analysis or risk analysis with the possibility of adding an additional dimension of time to the overall analysis. The 3DVM may represent financial information and may be used to determine such things as, for example, seasonal investment patterns, risk analysis or financial performance. It can also be used to investigate change in risk depending on the variation of certain factors. The 3DVM assists in the evaluation of financial information in a more efficient manner than previously available, since there is an additional level of information that may be presented and the information may be visually observed in addition to, and possibly in conjunction with, the simple two-dimensional information previously available. Instead of having to view multiple charts comparing two or three pieces of information, a single 3DVM may be viewed to analyze that same information. Thus, the totality of information is more easily understood and evaluated since it is compared in a single visual model.

The 3DVM presents all of the information available in a single three-dimensional image that may be viewed without the need for an apparatus to assist in the visualization. Alternatively, an apparatus may be used to assist with the visualization and/or to add further two- or three-dimensional information. The 3DVM utilizes the unique properties of a hologram to capture in full 3-D, including depth, a visual image of the information being presented. The 3DVM will enable the user to obtain a clear visual image of the information being analyzed or reviewed. The 3DVM also allow for clear and effective visual emphasis or instruction regarding the analysis to be performed without the risk of translational errors, language impediments, or written interpretation, or other problems associated with comparisons of only limited portions of information and using multiple charts or diagrams.

A representational image may be created by manually or automatically, using conventional photography, conventional holography, V-3D™ technology, by computer aided design, or by other methods now known or developed in the future.

These representational images can be used in a manner that provides even greater amounts of simultaneous information by superimposing it with a three-dimensional object and/or with a two-dimensional representational image (2DRI) or virtual three-dimensional representational image (virtual 3DRI) to provide additional information to the user. The superimposition of the 3DVM with these objects or representational images may be accomplished, using, for example, an HRI in a frame or positioning device, and providing the 2DRI using a slide or computer image projector, an overhead projector, a high intensity computer display, an optical combiner, a prismatic screen, a splitter, or some other form of image projection or display, including using a computer controlled display, such as, for example, a liquid crystal display (LCD), a plasma display, a light emitting diode (LED) display, fiber optics, or any other display that can either project an image or superimpose an image on an object using a light or other visible energy source, or allow light to pass through for projecting or superimposing an image of the displayed information directly or indirectly or transmitting it to an operator or detector (e.g., machine vision system), thereby causing a superimposition or the appearance of a superimposition of the image and the object (actual or virtual).

The representational images may also be created or prepared in one location and digitized and transmitted to a remote location, for example, via the internet, a LAN, WAN or other intranet, or via a storage medium, such as, for example, CD-ROM, DVD, optical, magnetic, electronic or some other form of currently known or future developed storage media or method of transmission or data sharing.

For example, where a flight controller is interested in seeing the scheduled flight patterns for a particular day of the week based on pre-filed and pre-scheduled flight plans a 3DVM may be created using, for example, V-3D™. This 3DVM could include multiple representation images, each corresponding to a particular hour of the day. Each of the representational images would include all of the flight plans and flight traffic for the particular hour represented by such image. The flight controller would thereby be able to have a visual image, for each hour of that particular day, of scheduled air traffic, thereby allowing an effective and efficient analysis.

As another example, where a company is interested in planning its risk analysis for a portfolio of assets, a 3DVM may be created with various factors plotted on a graph or chart. The 3DVM would include more information than currently possible using 2-D imaging or virtual 3-D imaging techniques because of the extra dimensions available through holographic imaging. Thus, the risk analyst would have greater analytical tools available to assess risk, and would be able to compare a greater number of factors in a single viewable image. Using V-3D™ would provide even greater possibilities for risk analysis because of the further ability to add another factor or dimension, such as, for example, time. Additionally, using the method described above, of superimposing it with a 2DRI, would provide even greater amounts of information for the analysis.

Geological exploration and mapping can be enhanced by the use of a 3DVM to map radar, sonar or other images obtained through a presently known or future developed detection technology. The image may be reproduced as a true 3-D image, i.e., hologram, which can be projected onto a 2-D or virtual 3-D representational image or display of a geographic location, for example, in the form of a surface map, or a physical object, for example, a model of the geographic location. Optionally, a physical or imaged depth guide may be provided to allow for confirmatory identification of underground geological characteristics corresponding to the projected holographic image. Using the 3DVM alone or in conjunction with the 2-D image and/or model (and optionally, the depth guide), an analysis may be performed with respect to the identification and/or mapping of a geological formation, for example, an underground ore or oil deposit or a previously undetected or uncharted fault line, with the added benefit of being able to provide context and a precise geographic location.

For geographical and/or topographical mapping, in space, subspace, aboveground, at the surface and/or underground mapping, above water, at the surface and/or underwater mapping, and similarly for locating, identifying and/or tracking objects in those regions, and for performing any type of analysis using information derived from those regions, enhancements may be achieved using a 3DVM in which a combination of technologies, such as, for example, radar, doppler radar, sonar, loran, satellite data, all types of photographic or photogrammetric methods or devices, magnetic flux detecting technologies, gravimetric technologies, and all acoustic and visualization technologies or techniques currently known or future developed, along with the information derived from such technologies or from the object being mapped, located, identified or tracked, including, for example, electromagnetic signals and their derived origins, heat signals, computer generated data, projected location plots or maps, radiation, shock waves and acoustic information are used to provide the information that forms the images for the analyses. These various types of information may be included in the 3DVM using, for example, coloration, shaping, lighting or illumination techniques to identify the particular source of information of the various types of information being displayed. Additionally or alternatively, the various types of information may each be displayed independently, for example, sequentially, through the use of V-3D or other holographic technologies, by, for example, controlled or selective illumination of the 3DVM, which could be accomplished, for example, through the use of light of selected wavelengths, variation in the angle of illumination or location of the 3DVM, and variation in observer position.

For urban, suburban, rural, land use, public works, structural, architectural, utility, thermodynamic, hydrodynamic, product, and other type of activities relating to impact assessment, development, planning, design, ergonometry, assessment, and/or analysis, and any other types of analyses using information derived from those modalities or sources, enhancements may be achieved using a 3DVM in which a combination of technologies, such as, for example, radar, doppler radar, sonar, loran, satellite data, all types of photographic or photogrammetric methods or devices, magnetic flux detecting technologies, gravimetric technologies, and all acoustic and visualization technologies or techniques currently known or future developed, along with the information derived from such technologies or from the object being developed, planned, designed, assessed, and/or analyzed, including, for example, electromagnetic signals and their derived origins, heat signals, computer generated data, projected location plots or maps, radiation, shock waves and acoustic information are used to provide the information that forms the images for the analyses. These various types of information may be included in the 3DVM using, for example, coloration, shaping, lighting or illumination techniques to identify the particular source of information of the various types of information being displayed. Additionally or alternatively, the various types of information may each be displayed independently, for example, sequentially, through the use of V-3D or other holographic technologies, by, for example, controlled or selective illumination of the 3DVM, which could be accomplished, for example, through the use of light of selected wavelengths, variation in the angle of illumination or location of the 3DVM, and variation in observer position.

For structural, micro-structural, materials application, stress, molecular, magnetic, electronic, thermodynamic, electrostatic, electrodynamic and other type of activities relating to development, modeling, design, assessment, evaluation and/or analysis, and any other types of analyses using information derived from those modalities or sources, enhancements may be achieved using a 3DVM in which a combination of technologies, such as, for example, microwave, doppler radar, sonar, all types of photographic or photogrammetric methods or devices, x-ray, radiation detection, magnetic flux detecting technologies, and all acoustic, visualization and crystallographic technologies or techniques currently known or future developed, along with the information derived from such technologies or from the object being developed, modeled, designed, assessed, evaluated and/or analyzed, including, for example, electromagnetic signals, heat signals, computer generated data, radiation, shock waves, magnetic flux and acoustic information are used to provide the information that forms the images for the analyses. These various types of information may be included in the 3DVM using, for example, coloration, shaping, lighting or illumination techniques to identify the particular source of information of the various types of information being displayed. Additionally or alternatively, the various types of information may each be displayed independently, for example, sequentially, through the use of V-3D or other holographic technologies, by, for example, controlled or selective illumination of the 3DVM, which could be accomplished, for example, through the use of light of selected wavelengths, variation in the angle of illumination or location of the 3DVM, and variation in observer position.

According to the present invention a holographic representational image (HRI) that makes up the 3DVM may be created using a variety of holographic techniques, including traditional holographic techniques, and V-3D™ as described in U.S. Pat. No. 5,748,347. The HRT is created in a manner in which it can be integrated into the task or analysis that is to be accomplished, in some instances with the HRI superimposed on a separate 2-D or virtual 3-D representational image or display and/or on a physical object. The task or analysis is then performed in a manner whereby the HRI and the information contained therein are used to improve the efficiency and effectiveness of the task and/or analysis being done, for example, by using the HRI to identify or verify the information necessary for the analysis.

For example, for the purposes of performing a risk analysis, a 3DVM comprised of an holographic representational image (HRI) containing certain financial/investment information may be created. This financial/investment information may relate to any variety of business information or compilations of information, including, but not limited to types of investments, i.e., stocks, bonds, options, etc., weighting, alpha, beta, P/E ratio, etc. The risk analysis may be performed using a number of 3DVMs depending on the amount of information being considered as part of the analysis and the necessary comparisons to be made. For example, if three key factors are being compared, the need to clearly view each piece of information would take precedent and a 3DVM containing just such information could be created. Alternatively, if additional information would assist in the analysis of the three key factors, it may be added to the 3DVM in various ways, such as by varying color, varying shapes, etc., or by utilizing a 2-D or virtual 3-D representational image in conjunction with the 3DVM. To provide for the additional factor of time, the 3DVM can be created using the V-3D™ technology.

As another example, the information obtained using the various methods of and technologies for information gathering and generation may be combined into a single 3DVM using V-3D™. The information that is gathered or generated, and processed using each of the various methods and technologies, in any number or combination, may be combined by interspersing strips or blocks of data from each and creating a single 3DVM which will display all of the information gathered or generated. Alternatively, the various pieces of information may be pre-processed to provide an enhanced series of images to be used in the generation of the 3DVM. The pre-processing may involve the synergistic consideration of various sources of information that potentially would contribute to the final series of images generated by the system. This is similar to the way a human perceives objects, using not only vision, but also other senses, including hearing, smell and touch. For example, doppler radar may provide information relating to the shape, density and approximate size of a particular object or location, however, it could not provide information relating to particular features of the object, such as color, surface details, relativistic details, etc. Optical (visual based) systems such as cameras could provide more details regarding color, shadows, and other surface details. Combining the information gathered and generated using these two methods/technologies would provide a more clear, detailed and accurate view of the object or location under consideration. The pre-processing combines the information provided by these sources and provides a single output of data to be used to generate the series of images to be used in the generation of the 3DVM. These images contain much more information than an image generated using any single method of or technology for information gathering and generation.

For a single or multiple stage analysis, single 3DVMs, multiple 3DVMs, compound 3DVMs, or any combinations thereof may be used. Alternatively, the 3DVMs can be used in conjunction with a single 2-D or virtual 3-D representational image, multiple 2-D or virtual 3-D representational images or compound 2-D or virtual 3-D representational images. For each stage of the analysis, the type of 3DVM or 2-D or virtual 3-D representational image used may vary depending on the number and types of analyses to be performed. Single 3DVMs are 3DVMs having one image contained therein. Multiple 3DVMs is a group of single 3DVMs, each representing one of multiple analytical tasks performed at a single stage of the multiple stage analysis. Likewise, multiple 2-D or virtual 3-D representational images is a group of single 2-D or virtual 3-D representational images, each representing one of multiple analyses performed at a single stage of the multiple stage analysis. A compound 3DVM is a single 3DVM containing multiple images. A compound 2-D or virtual 3-D representational image is a single 2-D or virtual 3-D representational image containing multiple images. Compound 3DVMs and 2-D or virtual 3-D representational images will be described in greater detail below.

Where a single 3DVM or 2-D or virtual 3-D representational image is used at a stage of an analysis, one or more pieces of information may be included in the 3DVM or 2-D or virtual 3-D representational image. For example, if there are three factors to be analyzed, such as, for example, in a geological analysis, depth, density and area, depth and area may be represented by the holographic image, and density, for example, by variations in color, all in a single 3DVM and/or 2-D or virtual 3-D representational image. The analyst must be able to distinguish between the various colors and identify the image in the 3DVM and/or 2-D or virtual 3-D representational image to accomplish the analysis effectively.

Where multiple 3DVMs or 2-D or virtual 3-D representational images are used for the analysis, various pieces of information may be included in each, to allow for a comparison of different groups of factors or different scenarios using the same or similar conditions or possibly different conditions, or to change specific factors so as to compare potential outcomes. Multiple pieces of information may be included in each of the 3DVMs or 2-D or virtual 3-D representational images. For example, if there is a risk analysis the purpose of which is to determine the structure having the lowest risk and highest return, with a range of allowable risk and a minimum required return, various inputs may be varied to help identify the best structure. To accomplish this goal, multiple comparisons must be made, each comparing multiple inputs, with some varying and others remaining the same. For each variation a separate 3DVM may be created so that the various factors may be visually analyzed to provide a better understanding of the effect of particular variations. If, for example, there were four alternative scenarios or possible variations, the analyst would require four separate 3DVMs and/or 2-D or virtual 3-D representational images to provide the full array of information regarding the four comparisons necessary to complete the analysis. The 2-D or 3-D representational images may be used in conjunction with the 3DVMs to allow the analysis to compare additional static or variable factors along with the information provided in the 3DVM without the need for additional 3DVMs, and consequently additional comparisons.

For example, the analyst can use multiple 3DVMs by switching between each of the single 3DVMs. This can be done automatically, such as, for example, by rotating a positioning device in which each of the 3DVMs is positioned, or manually, such as, for example, by the analyst positioning each individual 3DVM for viewing, one at a time or all together, for example, side by side.

Using multiple 3DVMs may be difficult at times since the amount of space available may be limited, or it may require, for example, the physical switching or moving of the 3DVMs from one location to another and or repositioning of the 3DVMs (or of the 2-D or virtual 3-D representational images). To reduce or eliminate these physical constraints, compound 3DVMs may be used. By using a compound 3DVM the multiple replacement or repositioning of the 3DVMs during the analysis process may be accomplished effectively and efficiently. A compound 3DVM is a single 3DVM having multiple sets of information contained therein. Each of the sets of information contained in a compound 3DVM may be accessible in a number of different ways, including, for example, by viewing the 3DVM at different angles or positions, by viewing the 3DVM under lights of different wavelengths, by viewing the 3DVM from different distances, by placing the 3DVM at different distances from the workpiece, and by illuminating the 3DVM at different angles. A compound 3DVM can be created using the V-3D™ process or conventional holography. A compound 2-D or virtual 3-D representational image can be created using conventional photography, printing, or using a computer controlled display, such as, for example, a liquid crystal display (LCD), a plasma display, a light emitting diode (LED) display, or any other display that can either project or superimpose an image using a light or other visible energy source, or allow light to pass through for projecting or superimposing an image of the displayed information.

To create a compound 2-D or virtual 3-D representational image using a single transparency, the two-dimensional information is first scan analyzed into the necessary sub-components, for example, vertical or horizontal stripes. These sub-components are correlated with one or more lenticulated lens elements. The sub-components from a first set of two dimensional information can then be interposed with the sub-components from a second set (or more sets) of two dimensional information in a fixed relationship. The resulting series of sub-components, for example, stripes, are situated in a predetermined spatial relationship to the lenticulated lens/filter, for example, by laminating or printing the stripes in register with the lenticulated lens/filter. The resulting compound 2-D or virtual 3-D representational image will present each of the sets of two-dimensional information, for example, images, to the projection optics (which can be similar to that from a slide projector) when the lenticulated side of the 2-D or virtual 3-D representational image is illuminated from a particular off-axis angle.

A compound 2-D or virtual 3-D representational image using a single transparency may also be created using color separation techniques, for example, by providing the representation of each set of two dimensional information in a different color or corresponding to a different wavelength of light. The projection optics would then present each of the sets of two-dimensional information using a light source of a different color or wavelength, for example, by using colored filters.

After creation of each 3DVM to be used in the analysis process, the 3DVMs must be physically arranged so that the information contained in the 3DVMs, for example, information regarding certain financial instruments, such as risk factors for each stock in a stock portfolio, may be utilized by the analyst. This may be accomplished by removably positioning each of the 3DVMs at their proper location corresponding to a stage of the analytical process. (The 2-D or virtual 3-D representational image may be placed in a predetermined position corresponding to the 3DVM, which may be fixed or adjustable by the analyst. The 3DVM is then coupled to, or positioned on or in a mounting or positioning device, which is either fixed or adjustable, at some predetermined or adjustable distance from the 2-D or virtual 3-D representational image.) The 3DVM is then coupled to, or positioned on or in a mounting or positioning device, which is either fixed or adjustable. A light source is then positioned in such a way that it provides for the information contained in the 3DVM to be utilized by an analyst, for example, by projecting the 3DVM information a predetermined distance from the plane of the 3DVM so that the information contained therein can be viewed and analyzed. These steps may be repeated for each stage of and step in the analytical process, or for as many stages and/or steps as desired.

Thus, the analytical process will include a new source of information for the analysts that will provide improved guidance, for example, through the use of a 3DVM type of representational image presented alone or in conjunction with an additional 2-D or virtual 3-D representational image. This 3DVM representational image can be used by the analyst to identify the information necessary for the analysis, for example, the comparative financial information or the change over time or based on a variation of a particular factor. The 3DVM utilizes the unique properties of the hologram to capture in full 3-D, the financial charts and comparative information sought to be presented to aid in the analysis.

For an analytical process having multiple analyses or tasks, for example, in the selection of a particular financial portfolio, where a particular group of equities is selected during the first analysis, in multiple steps, a particular group of fixed income securities during another analysis, also in multiple steps, etc., one or more 3DVMs may be used for each analysis, thereby requiring multiple 3DVMs to be used to accomplish the necessary analysis for each individual step. To accomplish the various analyses, the analyst is provided access to the information contained in each 3DVM and is able to cycle or switch between each of the multiple 3DVMs that are utilized. This may be accomplished by successively displaying the various 3DVMs and allowing the analyst to view and analyze the information contained in each 3DVM, before displaying the next 3DVM. For example, by using a mounting or positioning device with a rotating portion, the various 3DVMs may be coupled to, or positioned on or in a mounting or positioning device, which is either fixed or adjustable, (and which may be positioned at some predetermined or adjustable distance from a 2-D or virtual 3-D representational image). As the rotating portion rotates within a plane substantially parallel to the plane in which the virtual image is to be viewed (or in which the various 2-D or virtual 3-D images can be moved into a position at which the information from the 2-D or virtual 3-D representational images can become substantially in register with the 3DVM image). A light source is positioned as described above in a manner that will allow the information contained in the 3DVM to be utilized by an analyst, for example, by projecting the 3DVM information a predetermined distance from the plane of the 3DVM so that the information contained therein can be viewed and analyzed. When the analyst has completed the required task, the apparatus may be rotated so as to move the next 3DVM into the proper position for the next analysis.

When a compound 3DVM is used to provide the representational images to be used for the analysis, the different sets of information contained in the compound 3DVM may be accessible by viewing the 3DVM at different angles or from different positions. This may be accomplished by placing the 3DVM in an adjustable positioning device. The positioning device may be adjustable by fixed or variable increments. After the first set of information is accessed by the analyst through illumination of the 3DVM, as described above, the 3DVM may then be repositioned, for example, by moving the 3DVM horizontally, vertically, diagonally or a combination thereof. The 3DVM is then illuminated again to allow the analyst to access the next set of information. This process is continued until all of the information contained in the 3DVM necessary for the analyst to accomplish each required step or task is accessed.

Accessing the various sets of information in a compound 3DVM may also be accomplished by viewing the 3DVM under lights of different wavelengths. First the 3DVM is placed in a positioning device, as described above. The 3DVM is then illuminated using a light source of a first predetermined frequency. This allows the analyst to access the first set of information contained in the 3DVM. After the analyst has completed the step for which the first set of information was accessed, the 3DVM is illuminated using a light source of a second predetermined frequency. This process is continued until all of the information contained in the 3DVM necessary for the analyst to accomplish each required step or task is accessed.

Accessing the various sets of information in a 3DVM may also be accomplished by viewing the 3DVM from different distances. First the 3DVM is placed in a positioning device, as described above. The 3DVM is adjusted to a position at a first predetermined distance from a reference point, i.e., a first predetermined focal point. This allows the analyst to access the first set of information contained in the 3DVM. After the analyst has accessed the first set of information through illumination of the 3DVM, as described above, the 3DVM is then repositioned, for example, by moving the 3DVM toward or away from the reference point, i.e., to a second predetermined focal point. The 3DVM is then illuminated again to allow the analyst to access the next set of information. This process is continued until all of the information contained in the 3DVM necessary for the analyst to accomplish each required step or task is accessed. Alternatively, the various sets of information contained in a 3DVM may be accessible by viewing the 3DVM from different distances from the plane of the 3DVM, or by moving a reference object toward or away from the 3DVM. To provide for this type of viewing, the 3DVM must be created with the different sets of information at different distances or focal points from its surface, with a corresponding change in the light source distance or projection optics.

Accessing the various sets of information in a 3DVM may also be accomplished by illuminating the 3DVM at different angles. This may be accomplished by placing the 3DVM in a positioning device. The light source used to illuminate the 3DVM may be adjustable by fixed or variable increments or multiple adjustable light sources may be used. The light source is placed in a first predetermined position, or a first light source (located at a first predetermined position) may be used. The 3DVM is then illuminated allowing the analyst to access the first set of information located therein. After the analyst accesses the first set of information, the light source may then be repositioned, for example, by moving the light source horizontally, vertically, diagonally or a combination thereof, or a second light source may be used. Alternatively, the 3DVM may be repositioned. The 3DVM is then illuminated again to allow the analyst to access the next set of information. This process is continued until all of the information contained in the 3DVM necessary for the analyst to accomplish each required step or task is accessed.

Utilizing a 3DVM, a multiple stage analytical process may be consolidated into a single stage and/or numerous steps of an analytical process may be consolidated so as to be accomplished by a single analyst in a single step, thereby reducing the analytical time or the number of analysts.

The language free aspect of the 3DVT is also significant considering the expanding use of a multinational workforce, and the cost savings associated with translating information.

Data for use in the system according to the present invention may be obtained by any number of methods, including utilizing conventional sources of data identification and collection, such as, for example, satellite, radar, Doppler, sonar, ultrasound, just to name a few. For example, detection of above and below ground features may be accomplished utilizing radar (Doppler), high resolution photography/video, seismic, sonar and lasers. A detection system (e.g., a matrix) of seismic or sonar probes may be deployed to provide data relating to underground density, cavities, underwater features, and other features. The probes may be inserted or positioned below surface, for example, using drilling equipment, or deployed by aircraft, watercraft, underwater craft, or surface craft, with transmitters remaining positioned above the surface or at the surface.

A seismic resonator may be deployed through a controlled explosion, above or below surface level, for example, by a bomb dropped from an aircraft, or an explosive device inserted below ground level. The system identifies the below surface features by detection of the seismic waves and processing of the detected information. The data collected by the probes, including GPS position, time stamp and seismic signal record (as a result of the controlled explosion) may be processed or transmitted to a base station for processing or stored in on-site or remote data storage devices for collection and processing. Alternatively the data may be analyzed by hardware or software in the probes, at the surface, above the surface or in any other location.

Upon deployment of the probes below surface a transmitter may be maintained at or above the surface. For example, the probe deployment device may release one or more anchors just prior to or at the point of surface penetration and may provide for the unwinding of a cable which is dragged below the surface along with the probe to maintain electrical contact with the probe for uploading of data.

The system and method according to the present invention is able to localize and map the generated information and the generated information may be represented by a 3-D visualization in hard or soft copy. The information provided will identify the above and below ground features, including concealed cavities, using multi-modal data and advanced visualization techniques. The system and method according to the present invention is further able to add a time variation component to the imaged data for target destruction, modification or verification.

The apparatus and method according to the present invention also provides for data collection and analysis through unmanned surveillance and exploration of concealed cavities and hazardous areas utilizing various types of manned and unmanned crafts or vehicles, such as, for example, a miniature hovercraft, mobile robot (HoverBot) equipped with an ultrasonic transmitter/detector system for no-light exploration and/or an infrared camera and light source. To provide bi-directional information and image feedback capabilities, a fiber relay, such as, for example, a fiber optic cable may be unwound or miniature transmitters/relays may be deployed intermittently to provide for an uninterrupted data flow/transfer. The transmitters/relays may be deployed from the HoverBot at selected intervals or locations to provide for continuous, uninterrupted transmission/relay of information to a base station or control location. The system may operate independently or under the control of an operator.

The apparatus and method according to the present invention provides for mapping, surveillance and intelligence gathering and analysis and has the capability of being retrofitted for target location and elimination, through the use of toxins, explosives or other weaponry.

Concealed cavities and hazardous areas may be mapped using various data gathering apparatus that collect various types of data, such as, for example, ultrasound information, gyroscopic information, direction and distance information, GPS, and/or video/audio data. Data may be transmitted or captured using data storage or transmission devices incorporated with the apparatus or located remotely to the apparatus. Targets may also be located or identified by comparison to a stored database of information, and then eliminated using a variety of weaponry, including release of gas or toxins, explosives or other weapons systems if a correlation is confirmed.

DETAILED DESCRIPTION

Figure 1A:
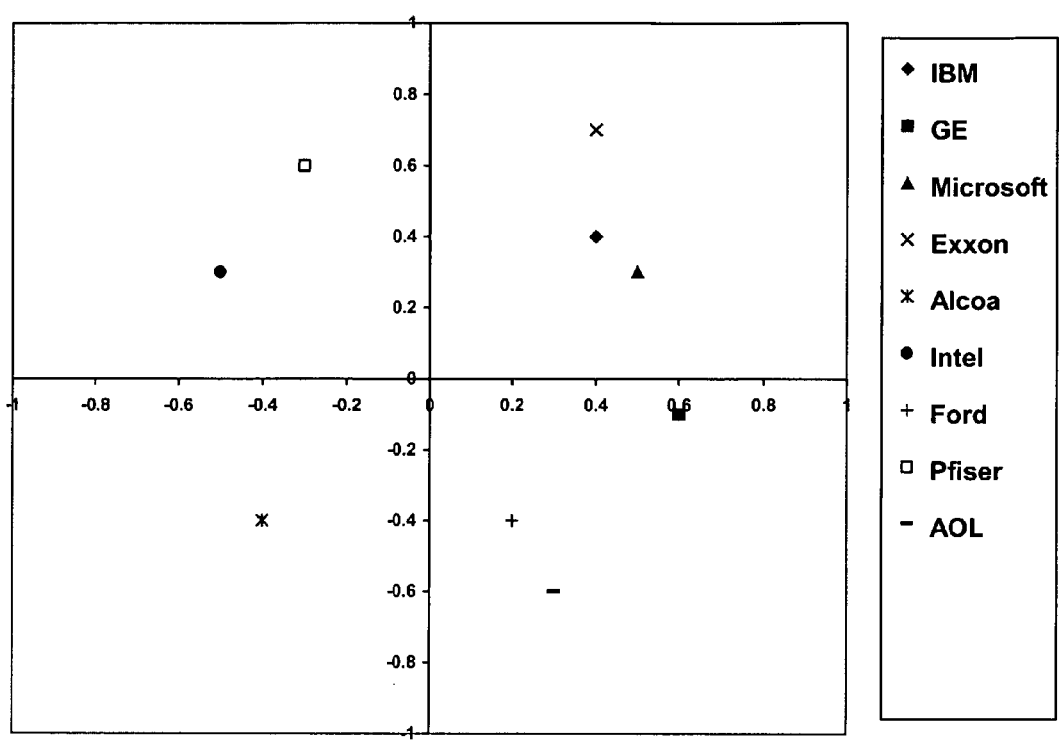
FIG. 1(a) shows a two-dimensional graph (x-y axis) of certain financial information as presented by the prior art.

Referring first to FIG. 1(a), there is shown a chart according to the prior art for presenting information relating to certain financial information. In FIG. 1(a) the x-axis represents the level of α risk for equity based securities at a fixed point in time, and the y-axis represents the level of β risk of those same securities at the same point in time. Each of the symbols depicted in FIG. 1(a) represents an equity based security and is located at a position representative of its α and β risk. In the view presented, the risk is fairly easy to characterize. However, a very limited amount of information can be presented in such a chart because of the lack of depth of field. FIG. 1(a) by itself is a fair representation of the capabilities of the prior art for providing and displaying this information for analytical purposes.

Figure 1B:
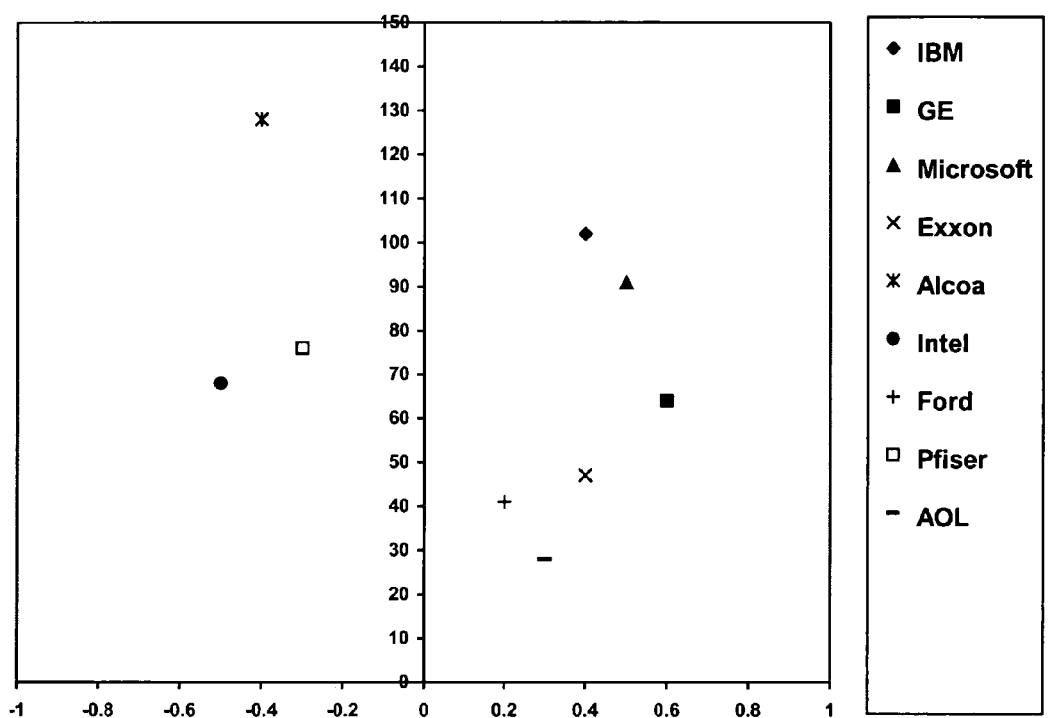
FIG. 1(b) shows a two-dimensional graph (x-z axis) of certain financial information as presented by the prior art.

In FIG. 1(b) there is shown a chart where the x-axis represents the level of a risk for equity based securities at a fixed point in time and where the y-axis represents the share price at that same point in time. When FIG. 1(a) is viewed in conjunction with FIG. 1(b), however, a clearer financial picture of the equity based security emerges because the share price can be compared to the level of alpha risk and the alpha risk could then be used to identify the beta risk.

Figure 1C:
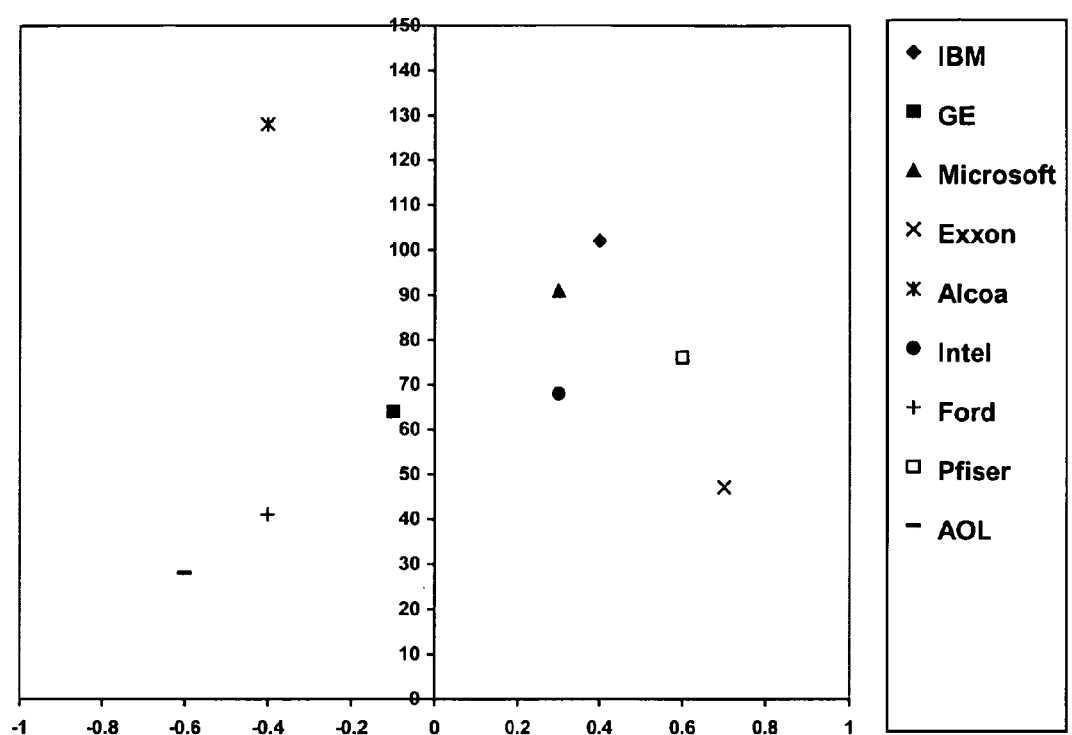
FIG. 1(c) shows a two-dimensional graph (y-z axis) of certain financial information as presented by the prior art.

In FIG. 1(c) there is shown a chart where the x-axis represents the level of β risk for equity based securities at a fixed point in time and where the y-axis represents the share price at that same point in time. When FIG. 1(a) is viewed in conjunction with FIG. 1(c), a clearer financial picture of the equity based security also emerges because the share price can be compared to the level of beta risk and the beta risk could then be used to identify the alpha risk. Furthermore, FIGS. 1(a), 1(b) and 1(c) can all be viewed together which would make it much easier to arrive at a clear understanding of the information provided.

Prior to the present invention, this was the means for accomplishing a financial analysis, which required the use of multiple charts or diagrams, as represented by FIGS. 1(a), 1(b) and 1(c). The prior art also allowed such information to be presented using a two-dimensional display that attempted to present information in pseudo-three dimensions using shading and other techniques. According to the present invention, FIGS. 1(a), 1(b) and 1(c) are incorporated into a single 3DVM which is created using holography. This provides the viewer with true 3-dimensional depth of field perception so that all of the information can be viewed and analyzed using a single representational image. This not only saves time in performing the analytical process (it requires the viewing of only one image as opposed to three), but also provides more information at a single time and location for performing the analysis.

Figure 2:
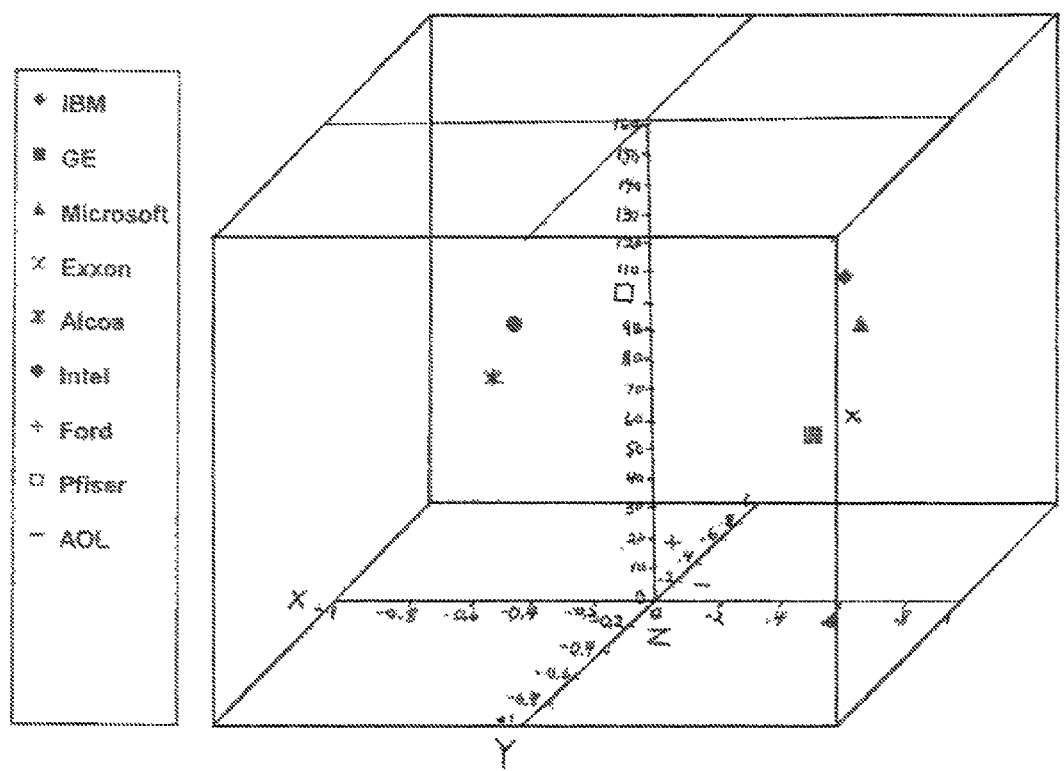
FIG. 2 shows a virtual representation of a 3DVM of the financial information from FIGS. 1(a), 1(b) and 1(c) as presented according to a first exemplary embodiment of the present invention.
Figure 3:
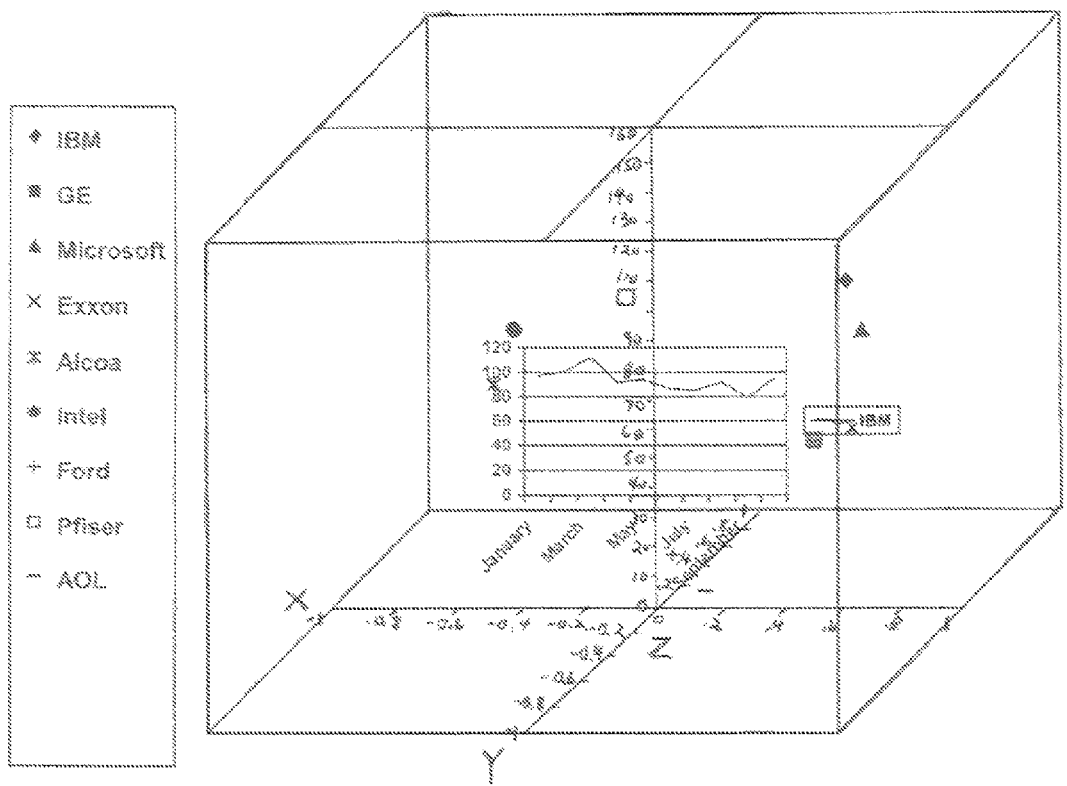
FIG. 3 shows a virtual representation of a 3DVM of the financial information from FIGS. 1(a), 1(b) and 1(c) as presented in conjunction with a real time two-dimensional display, according to a second exemplary embodiment of the present invention.

Referring now to FIG. 2, there is shown a virtual 3-dimensional representation of a 3DVM according to the present invention that includes all of the information provided in the charts shown in FIGS. 1(a), 1(b) and 1(c). Using the 3DVM of FIG. 2 instead of the three charts of FIGS. 1(a), 1(b) and 1(c) an analyst can perform the same analysis while having all of the information available in true 3-dimensions using one representational image and one location, and the analyst can compare all of the information during a single viewing. This allows for more efficient use of time, better comprehension, more thorough and complete analysis and better identification of issues, by allowing for the review and comparison of multiple sets of relevant information and the comparison of one set of information to all of the others, not just of two sets of information at a time. Moreover a 3DVM provides more accessible and comprehendible information to the analyst than even a virtual 3-dimensional rendering of the same information, because it is a true 3-dimensional representational image, and not an attempt to fool the eye into believing it is 3-dimensional Referring now to FIG. 3, there is shown a virtual 3-dimensional representational image of a 3DVM according to the present invention that includes all of the information provided in the charts shown in FIGS. 1(a), 1(b) and 1(c) that is integrated with a real-time display of data indicating historical share price and sales volume information. In this example, the 3DVM is even more powerful since it is integrated with a real-time display that allows the analyst to view the information in the 3DVM while keeping track of other information such as, for example, historical pricing information or other types of information, such as, real time pricing information, company news, etc. The information displayed using the real time display can also change automatically or be changed by the analyst during the analytical process.

Figure 4:
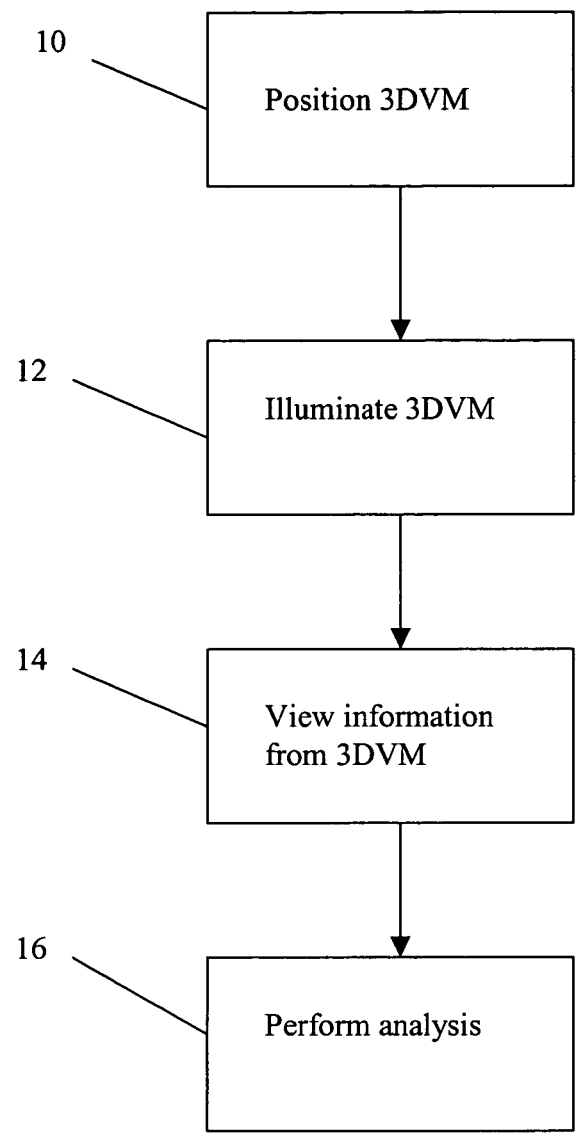
FIG. 4 shows a flow diagram of an analytical operation, using the 3DVM of FIG. 2, according to an exemplary embodiment of the present invention.

Referring now to FIG. 4, there is shown a flow diagram of an analytical process according to the present invention. In step 10 the 3DVM is placed in position for viewing. In step 12, the 3DVM is illuminated. The analyst, in step 14, views the information presented by the 3DVM in true three dimensions. In step 16 an analysis is performed using the information presented by the 3DVM.

Figure 5:
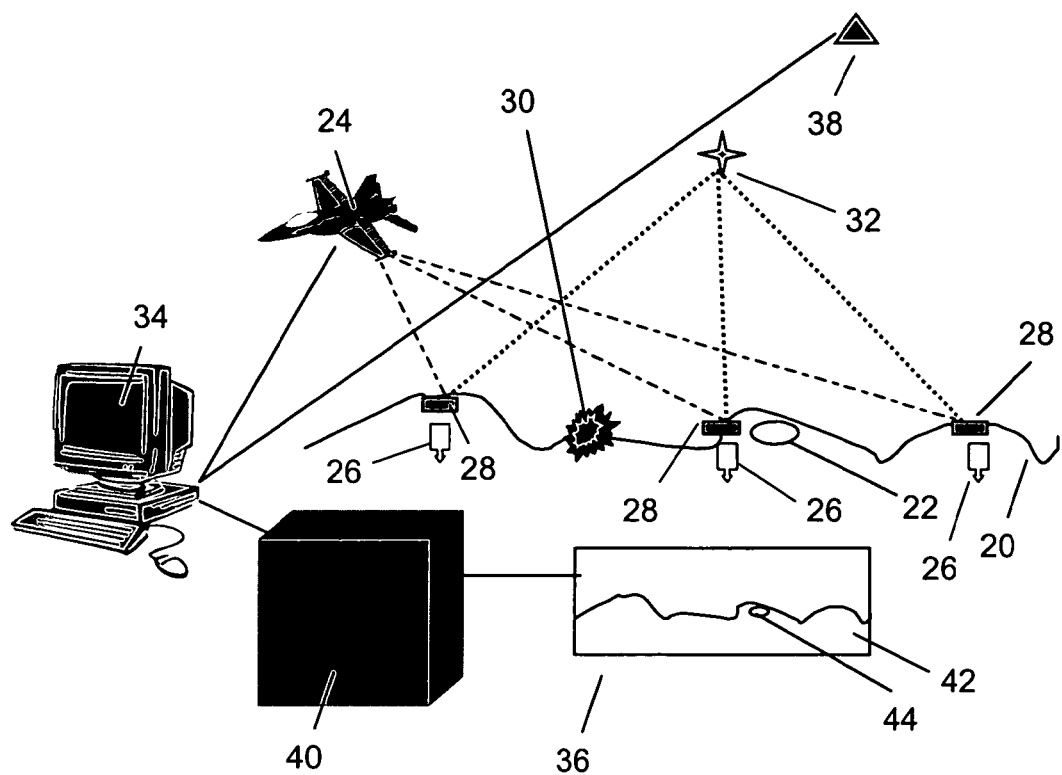
FIG. 5 shows a diagram of the deployment of a data generating and capturing device according to a first exemplary embodiment of the present invention.

In FIG. 5 is shown a deployment of a data generating and capturing device according to a first exemplary embodiment of the present invention. In certain areas of the world, the terrain is particularly difficult to navigate by conventional means. Although information relating to the above ground features may be captured using photography, radar, Doppler or other means of data collection and capture, information relating to the underground or other non-visible features may be more difficult or impossible to capture using such means. As shown in FIG. 5, the geography is such that the terrain 20 is particularly difficult to navigate. The terrain 20 includes many non-visible features, such as underground caves 22 (both natural and man-made) and caverns. An aircraft 24 releases probes 26, for example, seismic detectors, which are deployed in various locations for the purpose of capturing data relating to the underground features of the terrain 20, including the location and size of the caves 22. The probes 26 may be deployed at the surface or below the surface using ground penetrating ordinances or other devices, which insert the probes below ground level. The ordinances can be designed to deploy the probes 26 at any desired depth below the surface. Each of the probes 26 maintains contact with the surface via one or more wires or transmitters that are coupled to a transmitter 28 at or above the surface. After deployment of the probes 26, the aircraft 24 deploys a seismic trigger 30 that generates underground vibrations. The seismic trigger may alternatively be deployed by any type of missile or by land forces. The seismic trigger 30 can be an explosive device or devices, or a vibrating or vibration generating device, such as, for example, a thumper. Upon generation of the underground vibrations, the probes 26 capture the information generated by the interaction of the vibrations with the underground features. The information captured by the probes 26 is relayed to the transmitters 28 located at or above the surface. The transmitters 28 transmit the data collected by the probes 26 to one or more satellites 32, to a receiver located in the aircraft 24, or to some other receiver. The transmitters 28 also may transmit and receive data, such as, for example, time, location, identity, temperature, elevation, etc., at any interval, such as, for example, periodically, randomly, continuously or in response to a signal or stimuli, to a GPS or other type of system or satellite. The data from the probes 26 is sent to a processor 34 where it is processed into image data and from which it may be stored, or rendered as a representational image 36. The data from the probes 26 may be combined with visual topographic data collected by satellites 38 in a single representational image or in a separate representational image for display in conjunction with the topographic data, using, for example, a hologram generator 40. The probe data may also be combined with the other data sent to the satellites 32. The data from the probes 26 and other data may also be combined with the visual topographic data in a single or multiple compound representational image(s) or any number of separate representational images. For example, the representational image 36 may include topographical data 42 representing the topography 20 and data relating to the underground features such as cave data 44 representing the cave 22.

Figure 6:
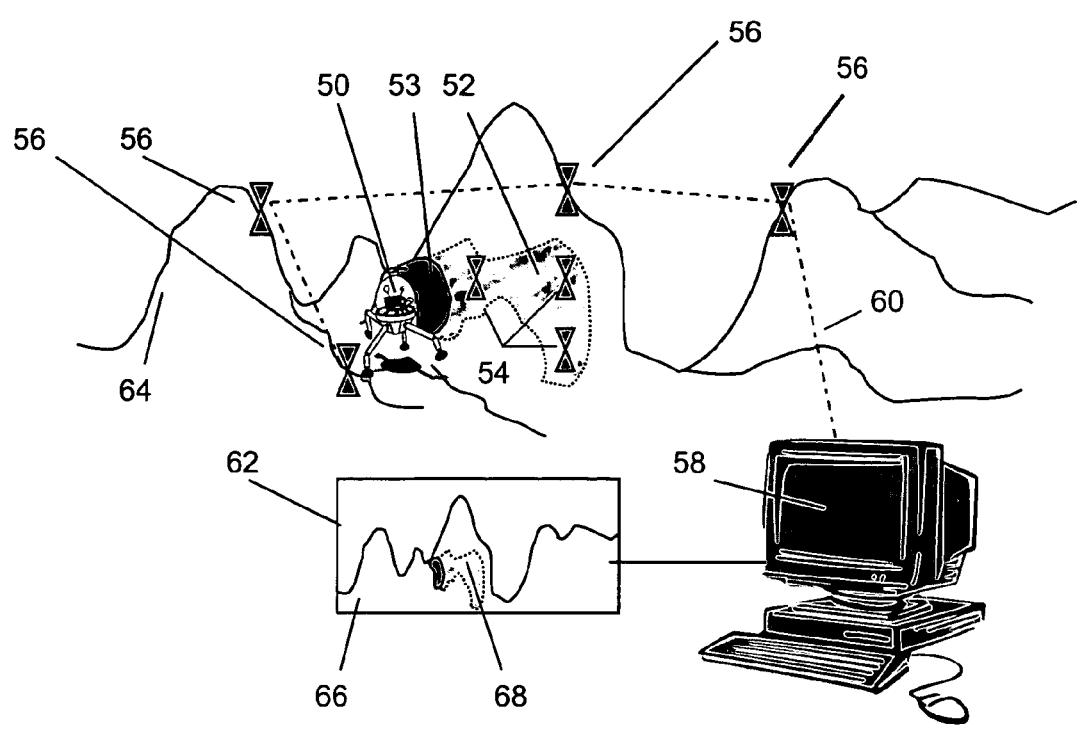
FIG. 6 shows a diagram of the deployment of a data generating and capturing device according to a second exemplary embodiment of the present invention.

FIG. 6 shows the deployment of a data generating and capturing device according to a second exemplary embodiment of the present invention. Although the device shown in FIG. 5 is capable of generating and capturing data relating to underground features, it is limited to identification of size, shape, density, location and other general details about the underground or non-visible features, it is not capable of identifying details about objects located within the caves or caverns or underwater. The device according to the embodiment of FIG. 6 generates and captures data relating to the specific features of a particular cave or cavern or other location. A craft 50 for exploration of a cave 52 is equipped with deployable communication links 54. The communication links 54 are deployed as the craft 50 travels to the cave 52 and locates the cave entrance 53 and as it navigates the internal passages of the cave 52. The communication links 54 are placed so as to maintain an uninterrupted data link with transceivers 56 located exterior to the cave 52 for data reception and transmission, for example, continuous or periodic, to a location outside of the cave 52, including to a base station 58, satellites, or some other location. The communication links 54 may transmit data to the base station 58, for example, via a communication link 60, such as, for example, cable, RF, microwave, optical or IR, or via some other coupling or communication method or device incorporated within the transceivers 56. The craft 50 may include a photographic or video camera, including IR capabilities and an IR light source. The craft 50 may also include ultrasound generators and receivers, and components for generating gyroscopic information, direction and distance information, GPS, and/or video/audio data. The base station 58 may also transmit data to the craft 50 to control various features or functions of the craft 50. The various pieces of information may be generated as the craft 50 travels within the cave 52 and can be used to map the cave 52 and provide data for allowing the craft 50 to navigate a return route. Cave data may be transmitted or captured using data storage or transmission devices incorporated with the craft 50 or located remotely to the craft 50. The data collected by the craft 50 or transmitted from the craft 50 may be utilized to generate one or more representational images 62 and may be combined with other information and/or visual or non-visual data, such as, for example, data about the topography 64 and GPS data, all as described above with respect to FIG. 5 for generating a representational image including topographical data 66, and cave data 68.

What is claimed is:

1. A method using a processor for analyzing data utilizing at least one representational image, comprising:
    using the processor to convert a first set of non-image data into at least a first representational image and a second set of data into at least a second representational image, wherein the at least first representational image is at least one of textual data or pictorial data, and wherein the at least second representational image is at least one of pictorial data or textual data;
    generating a displayed image using the at least first representational image and the at least second representational image, wherein the displayed image includes the at least second representational image;
    enhancing a portion of the at least second representational image upon a selection of a portion of the at least second representational image, wherein the enhancement includes presenting the at least first representational image in correspondence to the selected portion of the at least second representational image; and
    illuminating at least one of the at least first representational image or the at least second representational image to present information therefrom for analysis.

2. The method according to claim 1, wherein the analysis is performed by at least one of a person, a detector and a machine vision system.

3. The method according to claim 1, wherein the non-image data is at least one of Doppler radar data or sonar data.

4. The method according to claim 1, wherein the non-image data is financial data.

5. The method according to claim 1, wherein the non-image data is geological data.

6. The method according to claim 1, wherein the non-image data is flight control information.

7. The method according to claim 1, wherein the at least second representational image is a hologram.

8. The method according to claim 7, wherein the illuminating includes at least one of illuminating the hologram from a first angle and from a second angle and positioning the hologram in a first position for a first illumination and in a second position for a second illumination.

9. The method according to claim 1, wherein the illuminating comprises projecting at least one of the at least first representational image or the at least second representational image.

10. The method according to claim 7, wherein the analysis includes a first analysis performed from a first position and a second analysis performed from a second position.

11. The method according to claim 7, wherein the illuminating includes utilizing a light source having light of a first wavelength and a light of a second wavelength.

12. The method according to claim 1, wherein the first set of non-image data is pre-processed prior to conversion into the at least first representational image.

13. The method according to claim 12, wherein the second set of data represents a virtual three-dimensional object.

14. The method according to claim 12, wherein the second set of data is presented via a two-dimensional display.

15. The method of claim 1, wherein the at least first representational image is textual data and the at least second representational image is pictorial data.

16. The method of claim 1, wherein the at least first representational image is pictorial data and the at least second representational image is textual data.

17. An apparatus for analyzing non-image data utilizing at least one displayed image, comprising:
a display;
a processor, the processor converting a first set of non-image data into at least a first representational image and a second set of data into at least a second representational image, wherein the at least first representational image is at least one of textual data or pictorial data, and wherein the at least second representational image is at least one of pictorial data or textual data, and formatting the at least first representational image and the at least second representational image, such that the at least first representational image is presented in correspondence to a selected portion of the at least second representational image, wherein the first set of data represents an expanded set of data relating to the second set of data; and
an analyzer, the analyzer positioned at a predetermined distance from the display wherein the analysis is performed by the analyzer in combination with the displayed image.

18. The apparatus according to claim 17, further comprising a hologram, the at least first representational image presented on the display prior to transfer to the hologram.

19. The apparatus of claim 17, wherein the analyzer is at least one of a person, a detector and a machine vision system.

20. The apparatus of claim 17, wherein the second set of data is at least one of a three-dimensional object and two-dimensional data presented on the display.

* * * * *